US 6,572,802 B1

(12) United States Patent
Austin

(10) Patent No.: US 6,572,802 B1
(45) Date of Patent: *Jun. 3, 2003

(54) METHOD AND APPARATUS FOR CREATING PATTERNS IN CAST MATERIALS

(75) Inventor: Mark Austin, New Rochelle, NY (US)

(73) Assignee: The Spectrastone Co. International, Inc., Larchmont, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 09/593,234

(22) Filed: Jun. 14, 2000

Related U.S. Application Data

(62) Division of application No. 09/064,151, filed on Apr. 22, 1998, now Pat. No. 6,113,995, which is a division of application No. 08/579,697, filed on Dec. 28, 1995, now Pat. No. 5,795,513.

(30) Foreign Application Priority Data

| Apr. 1, 1999 | (DE) | 199 14 880 |
| Feb. 7, 2000 | (DE) | 100 05 276 |

(51) Int. Cl.$^7$ .............................................. B29C 47/00
(52) U.S. Cl. ............................ 264/75; 264/73; 264/77; 264/241; 264/245; 264/299; 264/309
(58) Field of Search ................ 264/73, 75, 77, 264/309, 241, 245, 299; 428/15

(56) References Cited

U.S. PATENT DOCUMENTS

| 3,670,060 A | * | 6/1972 | Cuffaro et al. | 264/77 |
| 4,343,752 A | * | 8/1982 | Cann | 264/71 |
| 5,248,338 A | * | 9/1993 | Price | 106/712 |
| 5,795,513 A | * | 8/1998 | Austin | 264/71 |
| 6,113,995 A | * | 9/2000 | Austin | 428/15 |

* cited by examiner

*Primary Examiner*—Deborah Jones
*Assistant Examiner*—Stephen Stein
(74) *Attorney, Agent, or Firm*—Sherman & Shalloway

(57) ABSTRACT

A novel process for creating aesthetically pleasing multi-color designs and patterns in cast materials, particularly cementitious materials, which may be used to imitate natural stone in appearance. The process includes the steps of preparing multiple colors of the casting material, geometrically loading these colors in a three dimensional array in a holding container according to formulas corresponding to particular patterns to be created, placing the geometrically loaded colors into a mold by means which include pouring, extruding and spraying, consolidating the mixtures in the mold and allowing them to set, and removing the cast structure from the mold followed by polishing and sealing if required. A removable matrix in the holding container provides the ability to reliably repeat patterns according to the loading formulas.

10 Claims, 6 Drawing Sheets

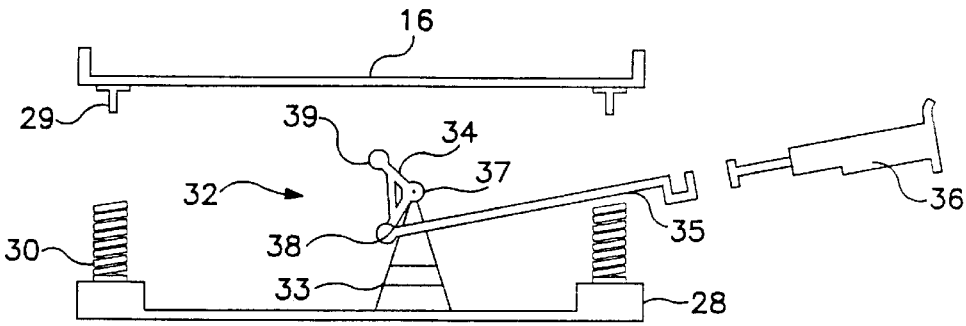
FIG. 18
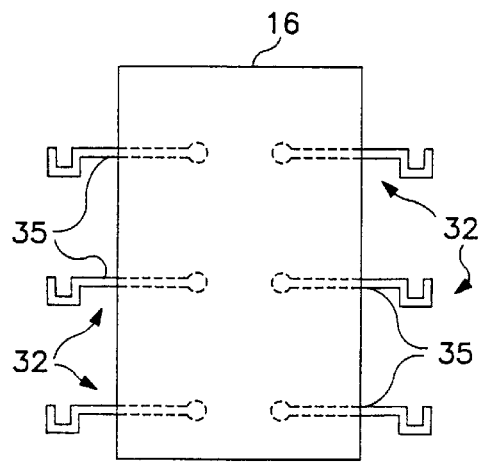
FIG. 19
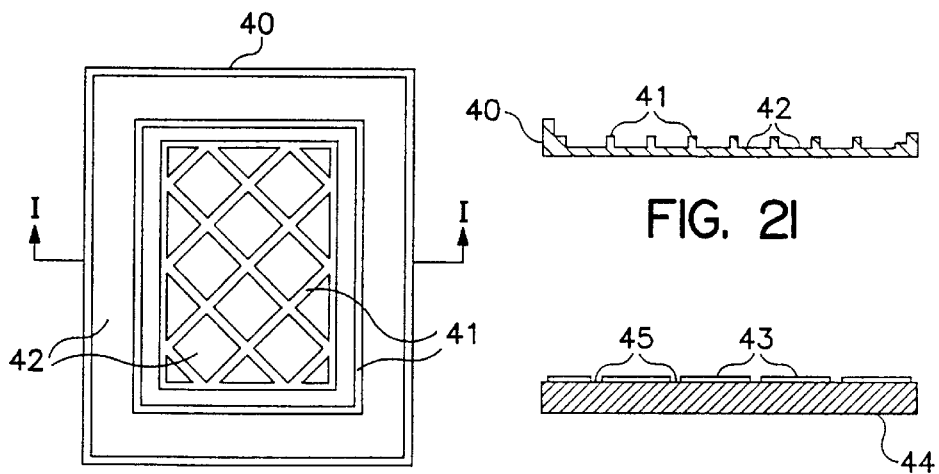
FIG. 21
FIG. 20
FIG. 22

METHOD AND APPARATUS FOR CREATING PATTERNS IN CAST MATERIALS

This is a continuation of application Ser. No. 09/064,151 filed Apr. 22, 1998, which is a divisional of application Ser. No. 08/579,697, filed Dec. 28, 1995, now U.S. Pat. No. 5,795,513.

FIELD OF THE INVENTION

The present invention relates to ornamental structures and surfaces, more particularly to cast structures and surfaces, and most particularly to cast cement-based structures which have integral color patterns and to a method of making such structures and surfaces whereby control over the pattern is achieved to the degree of being reproducible from one casting to the next. The method of this invention is also readily adaptable to automated procedures.

BACKGROUND OF THE INVENTION

There is a need to be able to create and control patterns in cement and plaster or gypsum based materials in both precast products and cast-on-site pieces. At present, the ability to create and control patterning in cement is extremely limited. Most commonly, if an attractive stone appearance is desired on a cement based material it is usually achieved by covering with a veneer of granite or marble.

Some of the disadvantages of marbles and granites which can be solved by this invention are lot-to-lot variation in color and pattern, limits in size due to costs of handling and transportation, difficulty in showing continuous patterns of marble veins, and cost. With regard to the problem of lot-to-lot variation and showing a continuous veining pattern, since marble and granite are natural materials, there is no control over the consistency of color and pattern from one piece to the next. It is often necessary to compare and match many different pieces to obtain a few which are sufficiently similar to be used to create a uniform appearance on a facing. As for size and cost, it is not practical to use marble in pieces larger than approximately four feet by eight feet.

The prior art is replete with methods to produce color and patterns in cast materials to simulate a natural stone appearance, such as marble or granite. However, in most instances there is little or no control over the pattern or its reproducibility. Furthermore, few, if any, of the prior art methods are readily adaptable to automation for consistent production of matching articles.

For example, U.S. Pat. No. 27,022, Lamb, discloses a method for manufacturing artificial marble in which balls of cement are mixed up to a consistency of paste and partially coated with dry paint. The balls are then placed in a mold and compressed causing the moisture within each ball to penetrate the dry material and consolidate into a single mass. The dry paint then appears as streaks on the surface of the article produced. This method is time consuming and requires precision on the part of the practitioner to achieve any degree of consistency from one piece to the next. Nor is it readily adaptable to an automated process.

U.S. Pat. No. 106,263, Frear, discloses the manufacture of artificial marble in which a solution of zinc sulphate, zinc chloride, sugar of lead, alum or salt is combined with a mixture of cement and silex to form a pasty mass having the consistency of mortar which is then cast in molds. By adding suitable colorants to the composition while it is in its plastic state or to the solution with which it is moistened, imitations of marble are obtained. Clearly, colorants added to the plastic mass would require some mixing to achieve a marble-like pattern, similar to the process used in mixing the two colors of a marble cake batter.

U.S. Pat. No. 134,300, Mellen, discloses a method of manufacturing artificial marble in which individual batches of cement of particular colors are prepared in separate vessels having small spouts. These are then individually poured into a mold in small streams in imitation of the veins of marble and the area between these streams filled in with cement of another color. Air is then blown across the mold to cause the colors to flow and mingle together until the desired effect is achieved. For finer veins, threads are dipped in colors and laid in the mold to be pulled through the cement after it is poured in. As with the Lamb patent, this method requires a degree of care and skill on the part of the practitioner to achieve any degree of consistency of pattern from one piece to the next.

U.S. Pat. No. 635,005, Summers, discloses artificial marble which is manufactured by mixing together lime-water and silicate of soda and adding a cement until it is fully incorporated. Pigments mixed with dry cement are then added and agitated into the mixture by stirring with a suitable tool. This mixture is then poured into a mold and allowed to set. This method, whereby pigment is merely stirred into a base mixture is the classic "marble cake" method and is very difficult to control from one casting to the next.

U.S. Pat. No. 704,621, Czermak, discloses a process of manufacturing artificial marble in which cement, or the like, is spread upon a smooth surface and allowed to partially set to form a slab. A liquid mass of mortar, or similar substance, having a color corresponding to the color of the veins desired is poured over the slab which is then cracked through its entire thickness with a suitable instrument to slightly displace its component parts. The liquid mass enters the cracks and produces the artificial veins which penetrate from face to face of the slab. Since the shape and direction of cracking in the slab is dependent in part on the application of the instrument and in part on the structure of the slab itself, it is unlikely that a great degree of consistency in pattern can be achieved from one piece to the next using this method. In addition, since cracking of the slab disrupts the internal structure, this method has the added effect of weakening the slab.

U.S. Pat. No. 928,061, Mitats, discloses an artificial marble which comprises portland cement, marble dust, sand, a colorant and water which are mixed together and compressed in a mold. In this method, it is believed that the resulting product will be substantially of one color with the marble dust providing any variation which may be present.

U.S. Pat. No. 2,280,488, Jenkins, et al., discloses a method and apparatus for making a stone like unit in which batches of colored concrete are premixed and added in layers to a blending box. A mixing grid is drawn vertically through the layers at least once to mix them in a variation of the "marble cake" method of the Summers patent. After the layers are blended in this manner, the mixture is poured from the box into a mold.

U.S. Pat. No. 5,248,338, Price discloses a colored marble concrete and a method of producing the same wherein a master mix of concrete of a desired primary color is prepared. Secondary or accent colors are added to the surface of the master mix within a container, such as a bucket, and are stirred to create a swirl pattern in the colors. The stirred mix is then poured into a mold. As with Summers, this the classic "marble cake" method which is difficult to control from one casting to the next.

In contrast to the prior art, the present invention provides a method whereby color and pattern can be controlled and replicated across many castings to provide uniformity of color and pattern as well as, where desired, continuous veining from one piece to the next. The method of this invention is adaptable to any size of casting, both on and off-site, and to most means for transferring casting mixtures to a mold as well as to automated production systems for producing substantially consistent and identical articles.

SUMMARY OF THE INVENTION

The invention discussed herein provides one with the ability to create cement based cast articles which can be the equal in beauty of some of the finest marbles and granites, while having the advantages of cost, ability to control and replicate color and pattern, as well as the ability to be created as needed, cast on site, and created in any size desired.

On-site castings can be as large as desired, in theory 20 feet by 100 feet or larger. The cost advantages of being able to readily produce a surface having a controlled and reproducible pattern on-site versus the expense of selecting, cutting, shipping and erecting natural stone facings on a structure are readily evident.

Central to the invention is the ability to control creation of a pattern in a castable material. This ability to control the pattern also renders it reproducible from one casting to the next. This control is effected by means of the viscosity of a pouring mix, the geometric arrangement of two or more mixes prior to pouring, the placement of two or more mixes during pouring and the consolidation of the poured mix after placement. The present invention employs all of these means in a novel method whereby castable materials are geometrically arranged in a container according to a set formula or chart for a particular pattern and poured to produce patterned structures or surfaces wherein the pattern is consistent and reproducible each time the formula and pouring criteria are followed.

It is therefor an object of this invention to provide a method for creating multicolor designs and patterns in cast materials comprising the steps of:
  a) preparing a mold to receive casting mixtures;
  b) preparing at least two wet casting mixtures of different colors at a viscosity to facilitate controlled pouring thereof;
  c) loading the casting mixtures into a holding container in a horizontal and vertical geometric arrangement according to a formula devised for a particular pattern;
  d) transferring the loaded mixtures from the holding container to the mold, and;
  e) consolidating the mixtures in the mold into a physically uniform mass and allowing the mass to set.

It is a further object to provide a method for casting multicolored cement based materials and controlling the patterning thereof, comprising:
  a) preparing a mold to receive wet cements based materials;
  b) preparing at least two wet cement based casting mixtures having different colors;
  c) providing a holding container having a removable matrix subdividing the container into at least two subchambers;
  d) loading the mixtures into the container in a geometric pattern according to the matrix and a repeatable formula devised therefor;
  e) removing the matrix from the container and attaching a baffled pouring aperture to the container, and;
  f) transferring the mixtures from the container to the mold through the pouring aperture whereby the baffled pouring aperture causes the mixtures to flow and combine in a predictable manner.

And it is a still further object of this invention to provide a method for producing reproducible colored and patterned cement based castings which simulate natural stone, comprising;
  a) preparing two or more different colored wet cement based mixtures at a viscosity whereby the mixtures are pourable but resist combining when placed against each other;
  b) loading the mixtures in a pouring container at geometrically determined positions both vertically and horizontally within the container and in specific amounts according to a formula corresponding to a particular pattern to be produced thereby forming a geometrically loaded bulk mix;
  c) transferring the geometrically loaded bulk mix from the pouring container into a prepared form, and;
  d) allowing the mixtures to set.

Further objects and advantages will become evident from the following description and drawings.

BRIEF DESCRIPTION OF THE DRAWINGS

FIG. 18 is a thumper apparatus for use with the casting table of FIG. 15.

FIG. 19 is an overhead view of a casting table with a plurality of thumpers in place.

FIG. 20 is a plan view of a casting mold for use with the method of the present invention to produce a structure having a formal pattern.

FIG. 21 is a cross section of FIG. 20 taken along line I—I.

FIG. 22 is a cross section of a casting produced using the mold of FIG. 21.

DETAILED DESCRIPTION OF THE INVENTION

Figure 1:
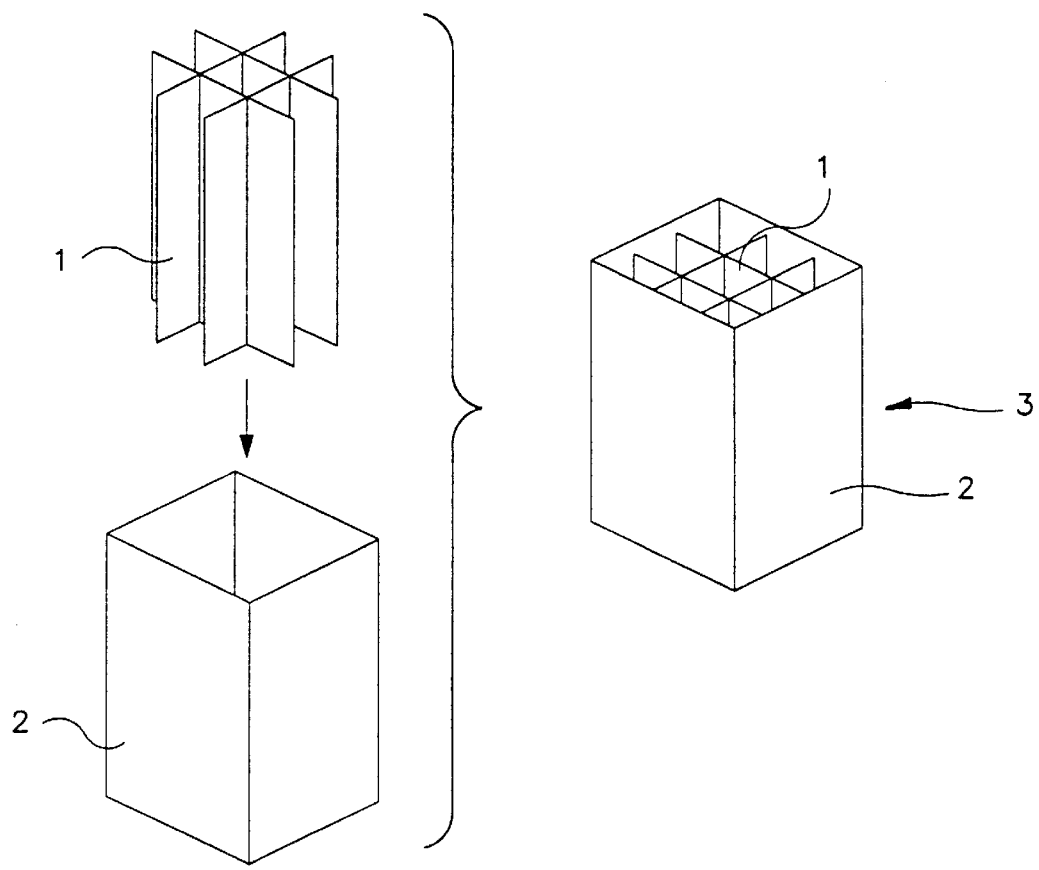
FIG. 1 is an exploded, composite view of a simple holding container and matrix combination used in the method of the present invention.

The method of the present invention has four key elements: control over the viscosity of the mixes, geometric loading of the mixes into a holding container, pouring or transferring the loaded mixes from the holding container to a mold, and consolidating the poured mixes. Together, these four elements combine to provide a level of control over the creation and replication of patterns in cast materials which was heretofore unavailable. In addition, a tremendous range of patterns is possible by modification of these elements, such modifications being recordable and the resulting patterns then being reproducible, as will become evident from the following description.

The method begins with the preparation of the original mixes of the casting materials as well as the preparation of the mold, mold liners and mold releases. It is preferable to premix all of the dry ingredients prior to casting as this reduces the mixing time. The materials have limited working times before they begin to set. Although setting times for casting materials may be controlled by means known in the art (i.e. chemicals, temperature control, etc.) these may not always be practical or desirable.

All patterns produced using the method require the use of at least two different mixes which vary primarily in the amount and shade of the coloring agent used. The manipulation and control of the contrast between the different colors is important to the aesthetic effect of the pattern. In addition, the mixes may differ in the fineness of their aggregates, their viscosity and additives. The size, or fineness, of the aggregate is an integral factor in the fineness, or detail, of the finished pattern. Accordingly, a smooth and detailed pattern will generally require the finest aggregate possible in order to obtain the finest finished pattern and surface. In actual practice, aggregate size is a variable which is taken into consideration and specified in formulas for particular patterns and may be as fine as fine sand or as course as the gravel commonly used in concrete. Similarly, although ordinarily all of the mixes used in any particular casting have the same or similar viscosity in order to ensure proper control over the degree of blending and the separation of colors, the viscosity of the mixes may be varied among mixes used in the same casting and within reasonable limits to generate certain effects. For example, a higher viscosity mix surrounded by lower viscosity mixes will produce a pattern resembling a rough vein running through a background of finer detail.

In practice, for most applications, a dry mixture of Portland cement and fine sand in a 1:3 ratio is preferred. To this mixture are added various powdered, light-proof and alkali resistant mineral oxides to obtain the particular color palette desired. Since the viscosity of the wet mixes used in casting is directly related to the amount of water added to the dry ingredients, those dry ingredients may be prepared in fixed quantities, packaged and stored until needed with the particular amount of water to be added indicated on the packages. The relative amounts of dry ingredients and water to be mixed for particular viscosities and setting times are readily obtainable from standard charts and texts in the cement industry.

Molds to be used should also be prepared in advance of the mixing of the casting materials. In this regard, molds may be made according to standards common in the industry. However, the molding surface is critical to the appearance of the finished product. Thus, for a fine finish, it is preferred that the mold have a smooth surface such as may be obtained by constructing the mold from polished metal, plastic, or the like. A commercially available mold release applied in a thin layer to the inner surface of the mold provides for easy release of the cast article as well as assisting in achieving a smooth surface thereon. Alternatively, mold surfaces may be textured so as to produce a desired three-dimensional design on the finished product.

Although the control of viscosity in cementitious materials is well known in the general art, it is considered one of the important aspects of the present method. The lower the viscosity of the wet casting materials, the finer the potential pattern will be, whereas the greater the viscosity, the more integrity the individual wet mixtures will have with respect to each other and the coarser the resulting pattern will be. It is noted that the uses of "coarse" and "fine" here do not denote a qualitative difference, rather they relate to the relative difference in the micro scale of the pattern itself, either of which could be equally desirable.

In practice the control of viscosity is a balancing act between the need for low viscosity for ease of placement into molds and low water content to achieve high structural strengths. In the present invention, while strength is obviously a desirable attribute, it is secondary to the achievement of controlled patterning. Structural strength can be given by other means to pieces produced by the method herein such as lamination to a support or backfilling with a reinforced concrete. Here, the control of viscosity serves to control the degree of interaction between the different mixes used. Typically, the lower the viscosity, the greater the interaction and the finer, more detailed and linear the resulting pattern. Conversely, the higher the viscosity, the less interaction there is between the mixes resulting in a pattern which is coarser, less detailed and clumpier or rounder.

Thus, the control of the viscosity of the mixes is important to the present invention. It also affects the mechanical apparatus and means used at different steps in the method since higher viscosities are more difficult to pour and require significantly greater shock waves to consolidate and bond the mixes. In contrast, too low a viscosity will permit the mixes to run together and the differentiation between them in the final product becomes indistinct and formless. Thus, although no special means are proposed for controlling the viscosity of the mixes, it is an essential component of the method which contributes to the overall ability to create, control and replicate patterns in cast materials.

It is within the scope of this invention to prepare the dry ingredients in pre-mixed sets keyed to a particular pattern so that water may be added in carefully predetermined amounts to achieve the desired viscosity for that pattern. Such sets of pre-mixed dry ingredients may include powdered super plasticizers and defoamers as well as other additives known for use in cement. Sets of pre-mixed dry ingredients are preferably packaged separately or in kits and may include apparatus and instructions for producing a particular article and/or pattern in a casting. For example, a kit for making a cast slab having a particular three color marbled pattern may comprise a set of pre-mixed dry ingredients providing a base color and two vein colors, mixing instructions, a loading formula preferably expressed as a chart or table as described later herein, and a holding container and matrix combination. The instructions also preferably include a mold description, if the mold is not provided as part of the kit, and pouring criteria specific to the particular design to be produced. As with the loading formula, pouring criteria are described later.

Following preparation, the wet mixes are geometrically loaded into a holding container according to a horizontal and vertical arrangement and in amounts which are pre-established according to a formula or recipe designed to achieve a particular pattern in the final cast article. Prior to the development of geometric loading in this method, the "marble cake" method in which accent colors were added on top of a base color and stirred or "swirled" in with a tool, as in Price, was the principal method of obtaining patterned cast materials. Clearly, whether the stirring is done manually or by mechanical means, this prior method introduces a degree of randomness which makes it difficult, if not impossible, to control the nature of the pattern and to achieve any level of pattern repetition from one casting to the next. In contrast, the geometric loading of the present method is, in essence, a controlled partial blending of the different mixes to produce an aesthetic pattern without the randomness factor introduced by stirring.

Geometric loading of the casting mixes, as practiced herein, is a method comprising placing specified amounts of each mix in a particular three-dimensional array within the holding container. The result is the creation of a single bulk mix composed of discrete three-dimensional islands of different colors at particular horizontal and vertical positions within the container. When poured or otherwise transferred in bulk from the holding container to the mold, the three-dimensional array behaves in a manner consistent with the principles of the flow of fluids to produce patterns which are substantially the same for each preparation and pouring of the same loading formula.

In creating a geometrically loaded bulk mix, it is understood that there are many parameters which can be modulated to create different loadings and, thereby, different patterns in the finished product. These parameters include the number of different colors, the quantity of each color in relation to the others, the sequence of loading, the quantity of each island as it is loaded, the total number of islands and the location of each island within the holding container both horizontally and vertically. All of these parameters can be expressed as part of a predetermined formula or recipe for a given pattern which can be followed to produce castings with patterns which are consistently the same from one casting to the next.

Figure 2:
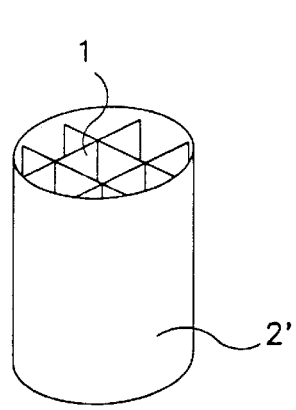
FIG. 2 is an alternative embodiment of the holding container and matrix combination used in the method of the invention.
Figure 3:
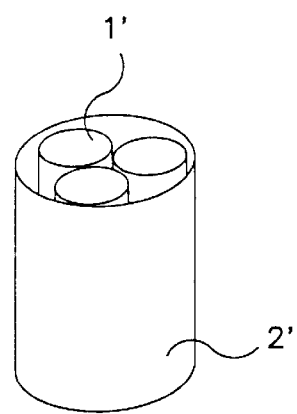
FIG. 3 is a further alternative embodiment of the holding container and matrix combination used in the method of the invention.

Geometric loading of the casting mixes is assisted by the provision of a matrix within the holding container which subdivides the container in a manner consistent with the particular formula. FIG. 1 illustrates a simple form of such a matrix 1 placeable in the holding container 2 to provide a subdivided container 3 having nine subchambers in a 3×3 arrangement. The matrix 1 is removable from the container 2 so as not to interfere with pouring and to facilitate cleaning. Although shown in FIG. 1 as both being substantially rectangular, the matrix 1 and the container 2 may be provided in different shapes as shown in FIGS. 2 and 3. Thus, in FIG. 2, the container 2' is round while the matrix 1 is substantially rectangular, whereas in FIG. 3, the matrix 1' is shown as a collection of tubes arranged vertically within the container 2'. Preferably each subdivision created by the matrix is numbered or otherwise distinguished and keyed to the formula for the particular design to be created. As shown herein, the formula is preferably expressed as a table corresponding to the particular matrix.

In use, the matrix 1 is placed inside the container 2 and the prepared wet mixes are loaded into the subdivisions in amounts and locations as specified by the particular pattern formula which is keyed to the arrangement of the matrix. Each subdivision may be loaded with a single color or with combinations of colors as the design requires. Table 1 is an example of a formula for a simple two color pattern.

TABLE 1

| CHAMBER | LOADING |
| --- | --- |
| 1 | 3 Pints White |
| 2 | 3 Pints Tan |
| 3 | 3 Pints White |
| 4 | 3 Pints Tan |
| 5 | 3 Pints White |
| 6 | 3 Pints Tan |
| 7 | 3 Pints White |
| 8 | 3 Pints Tan |
| 9 | 3 Pints White |

More complex patterns are obtainable using the method with more complex loading formulas. For example, the formula of Table 2, or even the asymmetrical formula of Table 3.

TABLE 2

| CHAMBER | LOADING |
| --- | --- |
| 1 | 1 Cup Tan, ½ Cup Black, 1 Cup Tan, ½ Cup Black, 1 Cup Tan, ½ Cup Black, 1 Cup Tan, ½ Cup Black |
| 2 | 3 Pints White |
| 3 | ½ Cup Red, ½ Cup Yellow, ½ Cup Red, ½ Cup Yellow, ½ Cup Red, ½ Cup Yellow, ½ Cup Red, ½ Cup Yellow, ½ Cup Red, ½ Cup Yellow, ½ Cup Red, ½ Cup Yellow |
| 4 | 3 Pints White |
| 5 | ½ Cup Black, 1 Cup Tan, ½ Cup Black, 1 Cup Tan, ½ Cup Black, 1 Cup Tan, ½ Cup Black, 1 Cup Tan |
| 6 | 3 Pints White |
| 7 | ½ Cup Yellow, ½ Cup Red, ½ Cup Yellow, ½ Cup Red, ½ Cup Yellow, ½ Cup Red, ½ Cup Yellow, ½ Cup Red, ½ Cup Yellow, ½ Cup Red, ½ Cup Yellow, ½ Cup Red |
| 8 | 3 Pints White |
| 9 | 1 Cup Tan, ½ Cup Black, 1 Cup Tan, ½ Cup Black, 1 Cup Tan, ½ Cup Black, 1 Cup Tan, ½ Cup Black |

TABLE 3

| CHAMBER | LOADING |
| --- | --- |
| 1 | 3 Pints Tan |
| 2 | 3 Pints White |
| 3 | 1½ Pints White, ½ Pints Red |
| 4 | 3 Pints Black |
| 5 | 1 Pint Red, 2 Pints White |
| 6 | 3 Pints White |
| 7 | 3 Pints Yellow |
| 8 | 1½ Pints Black, 1 Pint Yellow, 1 Cup Red |
| 9 | 1 Pint White, 2 Pints Tan |

The design of the pattern in the casting is, therefore, originally the three dimensional arrangement of the individual colors in the holding container which is then transformed into a two dimensional surface design as well as a three dimensional design through the casting. Preferably, the order of loading is the order in which the colors are listed for each chamber. Thus, the underlying concept of geometric loading is to create a specific three dimensional geometry in the holding container which, when poured from the container into the mold, results in a particular pattern corresponding to the loading geometry and the manner of pouring. Clearly then, the pour into the mold is a history of the order in which the holding container is loaded. Thus, if the subchambers are loaded in a regular array of alternating colors, such as in Table 1, the pattern produced will tend to be regular and linear from the beginning of the pour to the end. Alternatively, if the subchambers are loaded differently at the bottom than at the top, such as in Tables 2 or 3, the colors and pattern produced in the mold will be different at the end of the pour than at the beginning and will vary throughout the pour. Similarly, if loading is identical at the bottom and top with a variation midway through, that variation will show up in the mold midway through the pour.

After loading, the matrix is carefully removed so as not to disturb the three-dimensional array. In view of the preferred viscosity of the mixes being such as to retain the separate integrity of each color, removal of the matrix does not cause any mixing of the individual colors. In fact, if left to set in the holding container, the resulting block could be cut in cross section to reveal the discrete areas of individual colors in their geometrically loaded array.

After the container is loaded, the bulk mix is then poured or otherwise transferred to the mold. The act of pouring the loaded bulk mix into the mold provides another level of control over the resulting pattern which can also be specified by the formula for a particular pattern. It has been found that, by following the same pouring criteria for successive loadings of any one particular formula, the level of control is such that patterns produced in the cast articles are substantially consistent from one loading to the next. Thus, the present method makes it possible to create a series of cast articles having substantially identical patterns which resemble natural materials, such as marble, granite, or the like. Control is exercised through the following pouring criteria which are also adaptable to other transfer methods, such as extrusion: the design of the pour, the angle of the pour, the modulation of the pour and the edge geometry of the container.

Figure 23:
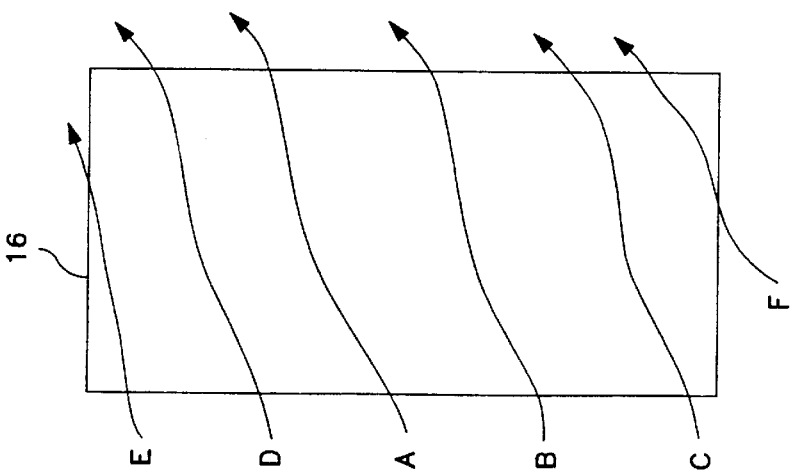
FIG. 23 is a representation of a pouring diagram for use in the method of the present invention.

The design of the pour refers to the design in which the bulk mix is laid down in the mold. Typically, the mold has a generally flat bottom, or face, and the bulk mix is poured in parallel rows or stripes until the bottom is covered. The pour design may be expressed as a diagram which is included with the chart for a particular formula. FIG. 23 illustrates a typical pour design diagram in which the mold 16 is designated and the design of the pour is indicated by lines A–F across the surface of the mold 16. The direction of the arrow indicates the direction the pour is to follow. In addition to indicating the pour diagram for a single formula, each of the lines may be keyed to separate formulas. For example, in the diagram of FIG. 23, lines A, B and C may be for a loading corresponding to the formula of Table 1, while lines D, E and F are for a loading corresponding to the formula of Table 3. The row or stripe design tends to result in the most naturalistic appearance to the final product. However, other designs, such as arcs, undulations, or even concentric circles may be used. Each design will result in a different but consistent pattern for a given geometrical loading of the container.

The angle of the pour refers to the angle formed between the direction of the container and the direction of the pour. This aspect of pouring is considered to comprise three basic operations. When the opening of the container faces the direction of the pour, the mix breaks over the edge as it pours creating a mottled pattern as the surface of the mix opens up to reveal the arrangement underneath. When the opening of the container is tangential to the direction of the pour, the mix pulls together forming thinner, more linear patterns. And, when the opening of the container faces in the direction opposite to the direction of the pour, there is little change in the relationship of the individual colors as they exit the container and are laid down in the mold.

Modulation of the pour depends, in part, on the viscosity of the mix. A higher viscosity will usually require a greater modulation, or vibration, of the container to cause it to flow smoothly. However, regardless of the viscosity of the mix, as the level of vibration is increased, the flow becomes more uneven. Thus, if the vessel is continually moved during the pour, the flow of mix transfers to the mold as a repetitive modulation of the width of the row or stripe. If the vibration is amplified further, the mix no longer flows in a continuous manner but rather drops in drips or clumps into the mold. Depending on the relative speed of the pour across the mold surface, this will create either discrete or overlapping pattern elements.

The edge geometry over which the mix is poured affects the pattern creation in one of two ways. First, it will either transfer the loaded geometry of the mix directly to the mold, if the edge is flat and as wide as the container, or it will cause the geometry to stretch and elongate if the edge is narrower than the container. Thus, where the holding container has a square cross section, a pour along an edge will produce a different pattern than a pour through a corner. The second edge geometry effect is dependent upon whether there is a lip at the edge. A lip along the pouring edge will create more of a breaking in the stream of the pour as discussed above in regard to the angle of the pour.

Figure 4:
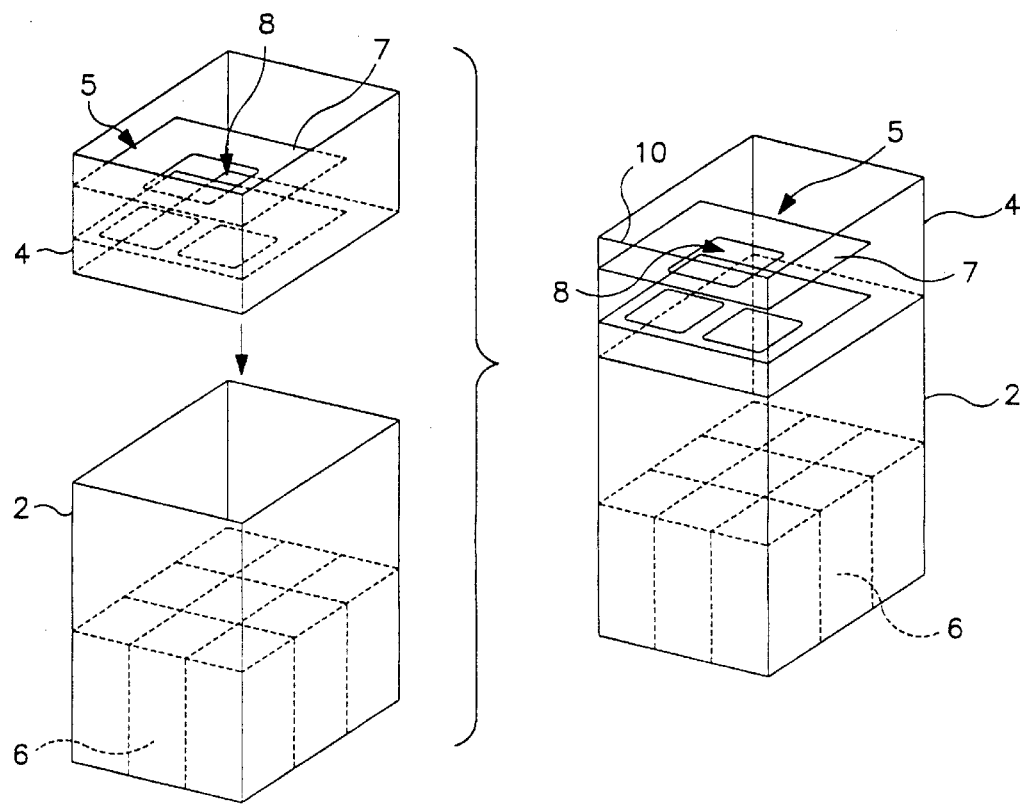
FIG. 4, is an exploded, composite view of a geometrically loaded holding container and baffled pouring chamber used in the method of the invention.
Figure 5:
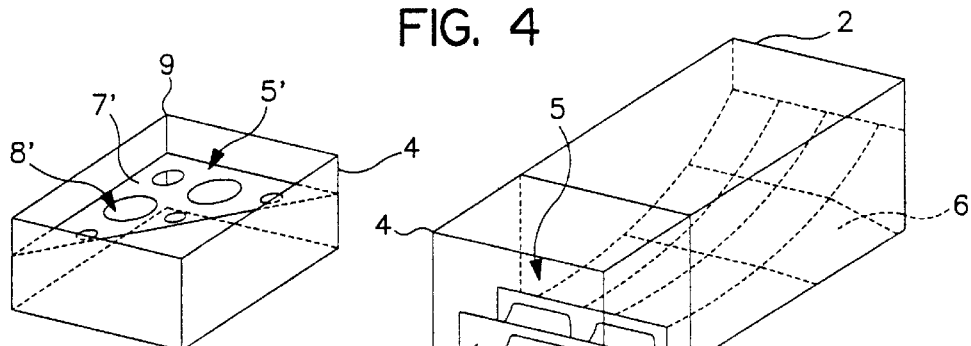
FIG. 5 is an alternative embodiment of the baffled pouring chamber used in the method of the invention.

The edge geometry of the container may be changed by attachment of a pouring chamber having a different size, shape, edge structure or the like. In addition, the pouring chamber may include baffles forming a specific path through which the mix must flow. FIG. 4 illustrates container 2 in which wet mixes have been loaded and from which the matrix has been removed leaving the geometrically loaded bulk mix 6. Attachable to the container 2 is a hollow pouring chamber 4 having a series of baffles 5. In this embodiment, the baffles consist of a pair of plates 7 extending substantially half way across the width of the pouring chamber and having apertures 8 which form a pathway for the bulk mix 6 to flow through. FIG. 5 illustrates a pouring chamber 4 with an alternative baffle 5' consisting of a single plate 7' on angle and having a plurality of apertures 8' therein. The pouring chamber of FIG. 5 also illustrates the alternative edge geometry of a corner 9 rather than a long edge 10 of the pouring chamber 4.

Figure 6:
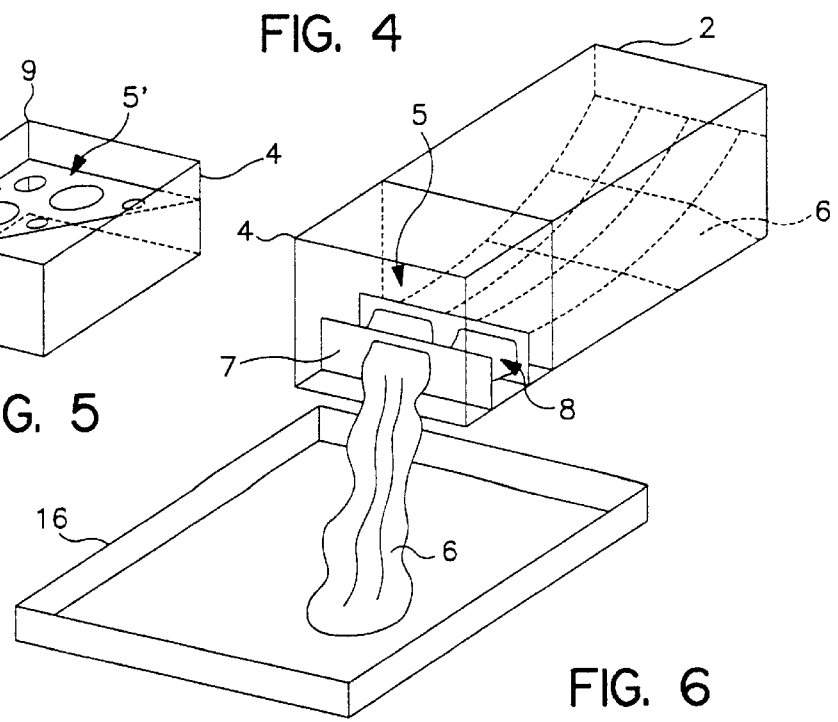
FIG. 6 is an illustration of the method of pouring the geometrically loaded mixtures using the holding container and the baffled pouring chamber of FIG. 4.

FIG. 6 illustrates a pour using the container and pouring chamber combination of FIG. 4. In this embodiment, the geometrically loaded bulk mix 6 tries to flow in a flat, wide ribbon and to exit the container 2 with the individual mixes in the order and arrangement in which they were loaded. However, by placing pouring chamber 4 with baffle 5 over the container opening, the flow is first divided to pass through the first baffle with two apertures and then recombines to flow through the second baffle having only a single aperture. The flow characteristics of the particular mix through such a baffle can be calculated according to the known flow characteristics of fluids of a particular viscosity using the principles of fluid mechanics whereby the effect of the baffle on the geometric arrangement of the mix and, thus, on the pattern of the casting can be reasonably predicted.

The criteria for a specific pattern can be expressed as an algorithm consisting of a) the formulas for the specific color mixes, including their viscosity; b) the geometric loading instructions or chart; c) the pouring diagram; d) the pouring instructions including the pour angle, edge geometry and/or baffles to be used, the modulation type or frequency, etc. All of these are mechanisms which lead to the control and reproducibility of the pattern. These mechanisms provide both range and control in the creation and replication of patterns in cast materials. In addition, they provide the means to control variability within a given pattern which is particularly desireable when emulating natural stone patterns. Thus, when one looks at a set of marble tiles, for instance, they can be recognized as being from the same quarry or block of marble, but it is apparent that they are not identical since natural stone patterns vary from piece to piece. These variations include shades of the particular colors; variation in patterns across one or several pieces; angle; thickness; and/or direction of veining; etc. By recording minor variations in the elements of the algorithm for a particular pattern, it is possible, through the present method, to introduce this naturalistic variation into a pattern while maintaining control over both the overall pattern and the minor variations of the elements which produce the naturalistic variations in the final product. Thus, the same formula or algorithm which specifies the criteria for a specific pattern, can also be used to provide the criteria for a set of patterns which vary in minor degrees corresponding to naturalistic variations but have, as their base, the overall specific pattern of a particular natural material.

Figure 7:
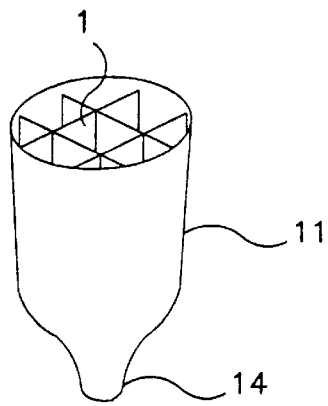
FIG. 7 is a bladder type holding container and matrix combination used in an alternative embodiment of the invention.
Figure 8:
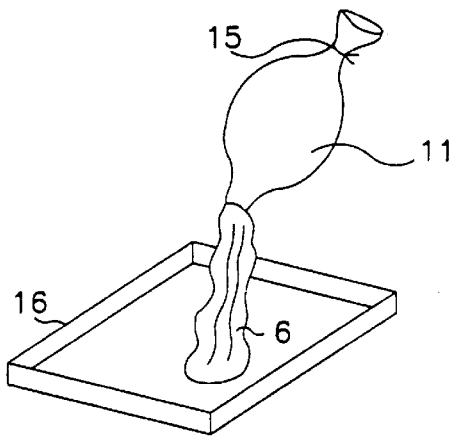
FIG. 8 is an illustration of the method of extruding the geometrically loaded mixtures using the bladder type container of FIG. 7.
Figure 9:
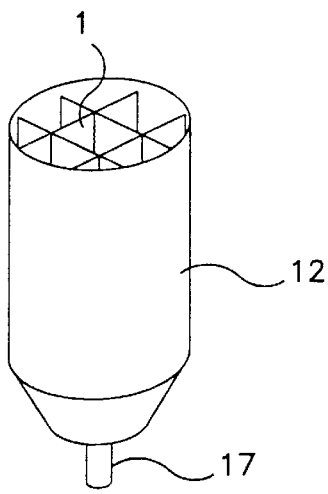
FIG. 9 is an alternative piston extrusion container and matrix combination used in the present invention.
Figure 10:
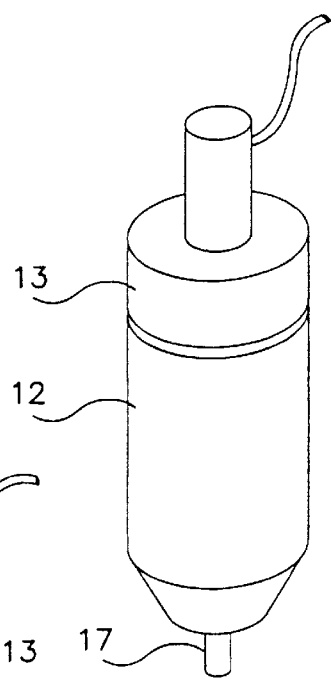
FIG. 10 is an illustration of the piston extrusion container of FIG. 9 with the piston member mounted.
Figure 11:
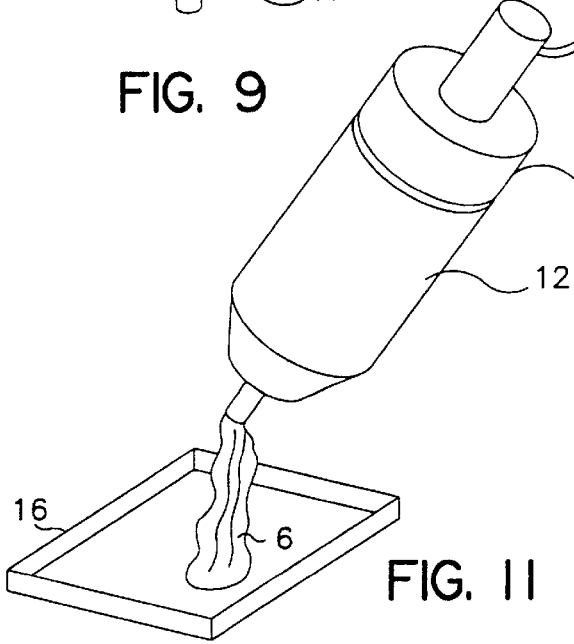
FIG. 11 is an illustration of the method of extruding the geometrically loaded mixtures using the piston apparatus of FIG. 10.

The same principles are applicable to the transfer of the geometrically loaded bulk mix by extrusion, either from a holding container in the form of a flexible bladder 11 against which external pressure is applied to extrude the mix as shown in FIGS. 7 and 8, or from a rigid container 12 to which a driven piston assembly 13 is mounted, as shown in FIGS. 9–11. In the case of the flexible bladder 11, the lower end may be provided with a nozzle 14 of a particular size or shape in which baffles may optionally be mounted and which is closed during loading. Matrix 1 is used for geometrically loading the bladder 11 and is removed before the mouth of the bladder 11 is closed and secured 15. The loaded mix is then extruded from the bladder into the mold 16 by applying pressure to the outside of the bladder 11 using manual or mechanical means. In a similar manner, rigid container 12 is geometrically loaded using matrix 1 as a guide. Matrix 1 is removed, a nozzle 17 is mounted to the lower end of container 12 and a piston and drive assembly 13 is mounted to the upper end. The piston applies internal pressure to extrude the geometrically loaded mix through the nozzle 17 into mold 16. In this apparatus, nozzle 17 may be interchangeable and provided in different sizes and shapes. The piston may be driven by pneumatic, hydraulic or mechanical means. As an alternative, air pressure may be applied directly to the bulk mix to extrude it instead of a piston. In these instances, the order of extrusion of the loaded mix will be the same as the order in which the individual mixes are loaded into the containers.

Figure 12:
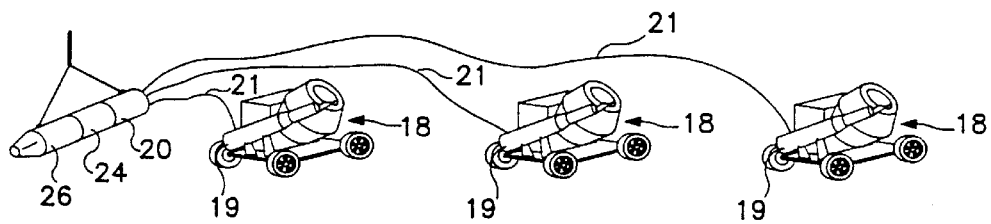
FIG. 12 is a representation of a system adapted to use the method of the present invention and suitable for automated on site or factory casting.
Figure 13:
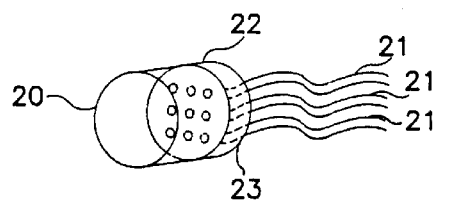
FIG. 13 is a geometric loading chamber for use in the system of FIG. 12.
Figure 14:
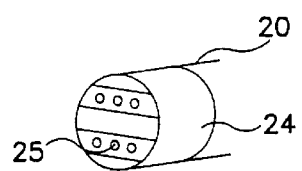
FIG. 14 is a mixing chamber for use in the system of FIG. 12.

With the appropriate equipment, the method of this invention may be applied to automated equipment which may be utilized either in factory production or to large scale, on-site, construction projects. FIG. 12 illustrates one set of equipment whereby this may be accomplished. In such an embodiment, the different mixes are prepared in mobile mixing machines 18 which have grout pumps 19 connected to a geometric loading chamber 20 by hoses 21. The geometric loading chamber 20 is equivalent to the holding container and matrix of the basic system and is illustrated in more detail in FIG. 13. In the geometric loading chamber 20, the hoses 21 from the grout pumps 19 feed into the chamber 20 in a matrix configuration 22 through a piping and valving system 23 which may be manually or automatically controlled to vary the configurations of the incoming mixes and to control their flow rates. Such a system is essentially a mechanical matrix and is necessary to achieve the proper mixing ratios and three dimensional array for the particular pattern formula.

Connected to the geometric loading chamber 20 is a mixing chamber 24 which is equivalent to the pouring chamber 4 and baffles 5. Under pressure from the pumps 19, the mixes flow from the geometric loading chamber 20 into the mixing chamber 24 for blending by active or passive baffles 25 and thence into the casting head 26. Active baffles are baffles which may have their relative position in the flow mixture changed by manual or automatic actuating means to change the degree and type of blending of the bulk mixture according to the pattern formula. Passive baffles are fixed such as the baffles 5 in the pouring chamber 4.

The casting head 26 controls the manner in which the bulk mix leaves the apparatus and is transferred to the mold 16. By changing the casting head 26, it is possible to obtain transfer conditions equivalent to pouring, extruding or spraying. Thus, for pouring, the casting head 26 has an opening equal to or larger than the volume of the mixture itself which allows the partially blended mixture to pour out of the casting head 26 into the mold 16. As discussed previously, the pour may be controlled by means of the design and angle of the pour as well as the use of vibration to modulate the pour and by changes in the edge geometry of the casting head opening.

For extruding, the casting head 26 has an opening which is smaller than the volume of the mixture which causes the mixture to emerge as a bead with the different colors as substantially linearly arranged pattern elements. As with the simpler extrusion apparatus discussed previously, changeable nozzles may be provided to vary the size and/or shape of the extruded bead.

For spraying, the casting head 26 is coupled to a source of compressed air which is blown into the casting head and through the mixture or it may be directed to blow into the mixture as it is extruded from the casting head. The air flow breaks up the mixture as it flows out of the casting head into droplets or globs of sizes which are dependent upon the viscosity of the mixture and the velocity and pressure of the air flow. Alternative methods of achieving a division of the mixture may be used, including devices such as a variable speed mechanical chopper at the casting head outlet.

The apparatus comprised of the loading chamber 20, mixing chamber 24 and casting head 26, is preferably mounted so as to be easily manipulated in any axis and in a manner to traverse a large mold during mix transfer. For this purpose, the apparatus may be suspended, as shown in FIGS. 12 and 16, or mounted to a movable and independently positionable apparatus such as a mobile, hydraulically actuated boom or a track mounted, multi-axis, aiming and traverse mechanism such as a robotic arm.

After the mix has been transferred to the mold, it must be consolidated. It is common practice in the pouring of cement or concrete to apply vibration to settle the poured mixture and eliminate air bubbles. The vibration commonly used, however, is high frequency, low amplitude vibration applied directly to the poured mix by insertion of a vibrating tool. In the present invention, such vibration is detrimental to the development of the pattern. Accordingly, consolidation is accomplished principally by causing low frequency shock waves to vertically traverse the poured mixture within the mold. Initially, several major shocks are applied to the underside of the mold to cause a general consolidation of the mixture followed by minor shocks at specific sites as needed to achieve a uniform surface.

In practice, the requisite shock may be produced by dropping or banging the mold followed by repeated strikes on the underside in specific locations and with hammers of varying weights. Mechanical means may also be employed but should be limited to avoid excessive liquefaction of the mix which may disturb the desired pattern. FIGS. 15–19 illustrate apparatus which facilitates the application of shock waves to the poured mixtures.

Figure 15:
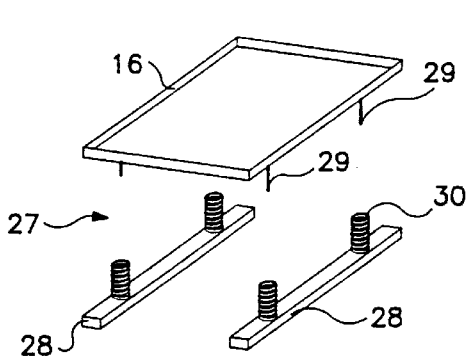
FIG. 15 is a casting table for use in the method of the present invention.
Figure 16:
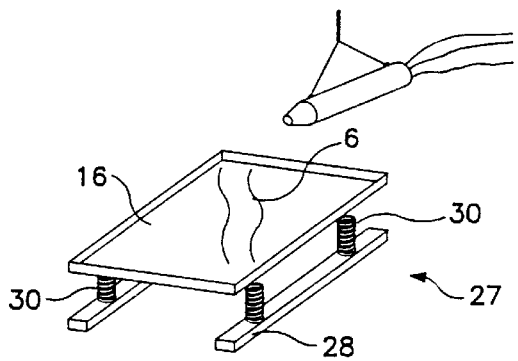
FIG. 16 illustrates the casting table of FIG. 15 in use with the system of FIG. 12.

In FIGS. 15 and 16, the basic apparatus of a mold support assembly 27 is illustrated. The assembly 27 comprises the mold 16 and support frames 28. Mold 16 has locating pins 29 depending from the underside which register with resilient support members 30 on the support frame 28. The support frames 28 and the resilient support members 30 raise the mold 16 a sufficient distance to permit the underside of the mold 16 to be struck.

Figure 17:
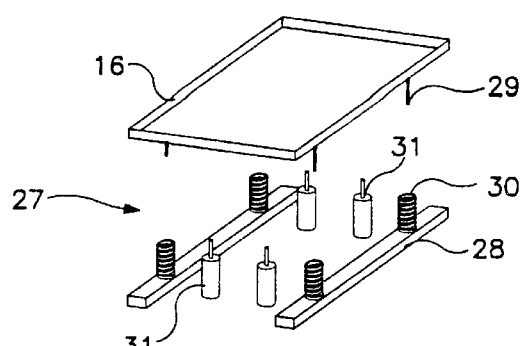
FIG. 17, is an alternative embodiment of the casting table of FIG. 15.

Striking of the mold 16 to apply shock may be accomplished manually or by mechanical means. FIG. 17 illustrates an alternative embodiment of the mold support assembly 27 which is provided with pneumatic hammers 31 positioned beneath the mold 16 to apply selected shocks. An alternative apparatus is illustrated in FIG. 18 and comprises a mechanical thumper 32 which may be operated by a standard jackhammer 36. The thumper 32 comprises a support 33, which may be moveable or fixed to the support frame 28, a pivot arm 34 and a transfer arm 35. Pivot arm 34 is a rigid right angle piece having a first pivot hinge 37 at the angle and a second pivot hinge 38 at the end of one arm. The end of the other arm is provided with a knob or head 39 which strikes the underside of the mold 16. The first pivot hinge 37 connects the pivot arm 34 to the top of the support 33 in a freely pivotable manner. The transfer arm 35 connects to the second pivot hinge 38 and extends out from under the mold 16 to connect to the tool end of the jackhammer 36. In this manner, the reciprocating action of the jackhammer 36 is transferred to the pivot arm 34 and causes the pivot arm 34 to rock about the first pivot hinge 37 so that the head 39 strikes the underside of the mold 16 sending the shock primarily vertically through the poured mix. As with the pneumatic hammers 31, a plurality of thumpers 32 may be positioned under the mold 16, as shown in FIG. 19, with transfer arms exposed for simultaneous or alternating operation.

The process of consolidation levels the surface of the poured mix without having to trowel or draw a leveling tool across the top of the mold which would adversely affect the pattern on that surface of the casting. Consolidation also serves to bond the chemical and physical components of the poured mix into a structural whole. In addition, consolidation using shock waves, as opposed to the more common high frequency inserted vibrators or vibrating tables, has been found to produce a fractalization, or interweaving, in the pattern which tends to follow the naturalistic lines seen in fractal geometry.

It is important to understand that the uses of vibration here are very different from those traditionally used in the cement/concrete industries. This difference is both in type and purpose. Traditionally, cement or concrete, when poured, is spread out mechanically or by hand and is then struck off by a tool drawn across the poured mass to produce a flat surface. It may then be settled and any air driven out by means of high frequency vibration applied by an implement inserted into the poured mix. This type of vibration spreads out in a horizontal pattern and results in a greater liquefaction of the poured mix. In the present method, that degree of liquefaction results in less definition in the pattern whereas the mechanical spreading normally employed adversely affects the pattern and effectively negates the control obtained through the geometric loading. Therefor, the present method employs low frequency vibration applied as shocks to the under side of the mold to settle and level the pour. Since the mix after pouring is generally uneven it requires uneven vibration to settle the pour into a flat piece. Accordingly, the first, or primary, shocks are applied beneath the highest areas of the pour causing them to settle downward and to flatten and fill any adjacent voids. Linear patterns tend to stretch out and join, thereby producing the impression of continuous veins. Secondary shocks of less strength are applied as needed at selected areas to even out the surface without having to strike across the surface of the pour.

After setting, the casting is removed from the mold and may be finished by any of the common methods of cleaning, polishing and sealing known in the art. For example, cleaning may be accomplished with soaps or a solution of muriatic acid followed by an ammonia wash. Polishing may employ the same equipment and methods used in stone working. However, it is important to remember that polishing actually cuts into and removes a portion of the cast material and may affect the pattern. Generally, however, careful light polishing has been found to remove any surface unevenness which may result from bleeding and tends to sharpen the pattern making it more distinct.

Sealing can also be accomplished with commercially available materials and is important for the protection and enhancement of the pattern. In the case of protection, cementitious materials are porous and will absorb water and stain. Sealing the surfaces of a casting prevents any absorbtion and staining which would interfere with the pattern.

The different methods of transferring the loaded mix to the mold, ie., pouring, extruding or spraying, tend to create patterns resembling particular natural materials. Thus, the patterns produced by pouring tend to resemble marble, those produced by extruding tend to resemble sandstones and travertines, while the method of spraying a geometrically loaded mix creates patterns resembling granite. Although these methods of transfer tend to create patterns resembling these various types of stone, it will be evident that the user has the ability to deviate significantly in both color and range of pattern from those actually found in nature. On the one hand, colors and control of the pattern can create patterns deceptively similar to natural stone products whereas, on the other hand, patterns can be created which will clearly be man-made.

The following examples illustrate the method as applied to these particular transfer methods using the formula of Table 1.

EXAMPLE 1

A mold of suitable size and material is prepared with an appropriate mold release. Dry mixes corresponding to the colors in Table 1 are prepared and water is added to produce the wet mixes of the desired viscosity. Using the apparatus of FIG. 1, with the subchambers numbered left to right and top to bottom, the holding container 2 is loaded according to the formula. The matrix 1 is removed and the loaded mix is poured into the mold in a series of parallel rows. The process of pouring and the edge geometry of the container combine to blend the loaded colors in a manner which resembles a broad veined marble. If narrower veining is desired, a pouring chamber and baffle combination is mounted on the container prior to pouring. The effect of the baffles is to create finer detailing by causing the mix to flow around and through the obstacles posed by the baffles resulting in a greater blending of the colors and a narrower flow. Appropriate shock is applied to the mold in the manner disclosed to settle and consolidate the mix.

EXAMPLE 2

A mold and mixes are prepared as in Example 1. An extruding apparatus, as in FIGS. 9 and 10 is provided with a nine chambered matrix 1 and the container 12 is loaded according to the formula. The matrix 1 is removed, the piston and drive assembly 13 is mounted and the nozzle 17 is opened. Upon activation of the piston, the loaded mix is extruded through the nozzle 17 forming a large bead. The islands in the geometrically loaded mix become very narrow, linearly patterned colored elements as they are forced through the nozzle 17 into the mold 16. To simulate the appearance of sandstone or travertine stone, the bead is extruded in slightly uneven rows. Shocks are applied to the mold to settle and consolidate the mix which is then allowed to set. Different effects on the linearity of the pattern can be obtained by changes in the shape and size of the nozzle and by means of the pouring criteria as previously discussed.

EXAMPLE 3

In this example an extruding apparatus as in Example 2 is prepared and an air hose leading from a compressed air source to an exit immediately adjacent to the extruder nozzle 17 is mounted thereto. The geometrically loaded mix is extruded from the nozzle into the air flow and is broken up into multicolored drops or globs which are deposited in the mold. Consolidation of the globs in the mold produces a pattern in the casting which resembles the mottled appearance of granite. It is understood that the particle size of the globs and, thereby, the apparent size of granite-like mottling can be controlled by varying the relationship between the size and shape of the nozzle and the air pressure and flow rate.

It will be readily apparent to any one versed in the art that there can be other variations made to the method which fall within the scope of the invention. For example, the size and shape of the holding container can vary as can the size, shape and number of divisions in the matrix. Most importantly, the formula for geometrically loading the container is infinitely variable in terms of colors, arrangement and amounts. However, once a formula for a particular pattern has been devised, the present method provides a means whereby that pattern can be recorded and reproduced by following the formula and the particular pouring criteria therefor.

Figure 24:
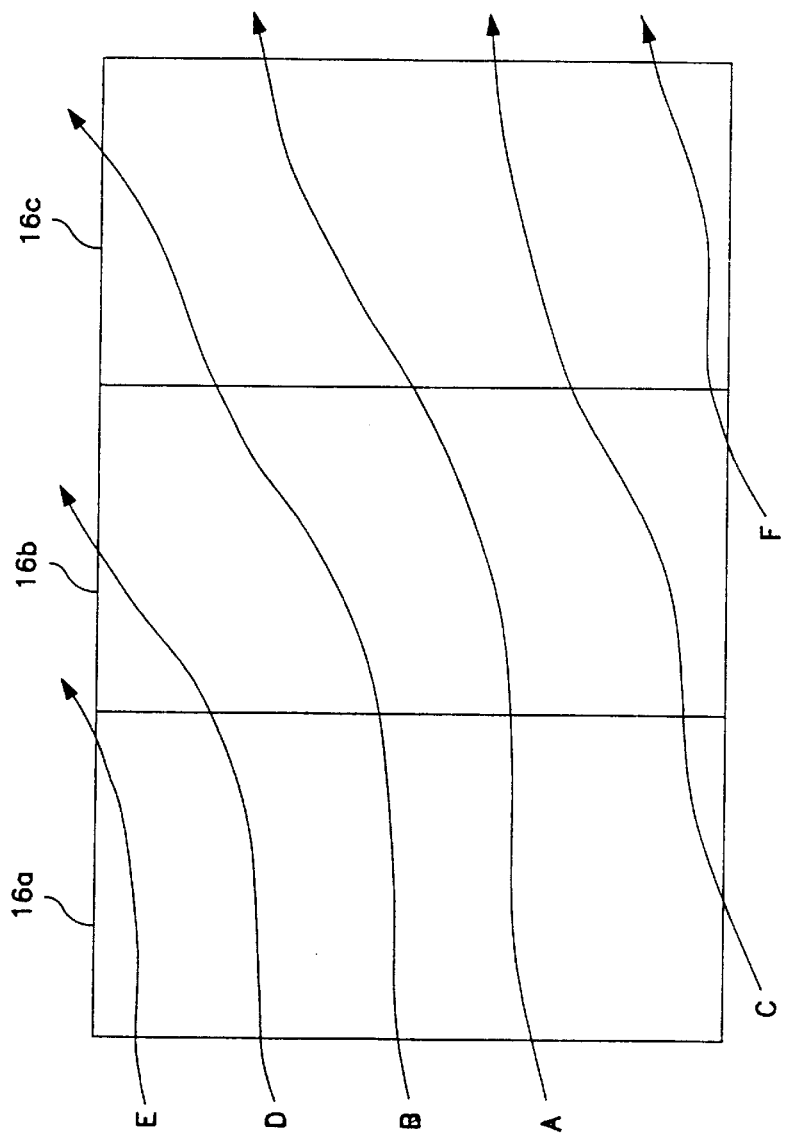
FIG. 24 is a representation of a pouring diagram for producing a continuous pattern across more than one casting using the method of the present invention.

The present method is also adaptable to produce pieces having the appearance of marble or other natural or artificial patterns, but with a pattern which continues from piece to piece as if it were cut from a single block of stone. To create this effect of continuous patterning, a pouring diagram, similar to that discussed previously, is created by making scale drawings of the shape of the pieces to be cast, showing them in their adjacent positions. FIG. 24 illustrates such a diagram in which pour lines A–F are drawn across the borders between representations of a plurality of molds 16a, 16b and 16c, the lines may indicate the pour design as in FIG. 23, or they may correspond to an arrangement of veins in the pattern to be cast. In complex patterns it is recommended that each vein be labeled with its particular geometric loading formula and pouring criteria. After the diagram is completed, the edges of the molds are marked with entry and exit points for each vein, matching them with the diagram and with the mold edges of each contiguous piece to be cast. In an automated production environment this process can be facilitated by using a grid system marked on the mold edges. After the mold edges are properly delineated, the molds are filled in a manner as hereinbefore described, with the exception that each sequential pour must follow its predetermined path according to the pouring diagram. The finished castings, when removed from their molds, are erected in their properly adjacent positions to present a continuous pattern across the several pieces. Using this system, individual panels may be cast in any order, but when cured and removed from their molds, may then be arranged in the proper order to display the continuous pattern as originally designed. In an automated environment a computer controlled robot arm combined with a casting head such as in FIG. 12, may be used for transferring the mixes to molds. In such an environment, it is within the scope of this invention to establish the pattern formula and pouring diagram criteria as part of the software program controlling the action of the arm.

The method of this invention can also be used to produce articles having a formal design in combination with the various patterns. In this instance a mold 40 is produced having the formal pattern as raised portions 41 on the base of the mold as indicated in FIGS. 20 and 21. The mold is filled with a desired geometrically loaded mix in a manner which will result in the recessed areas 42 having the desired stone-like pattern. If desired, the poured mix can be backfilled to add strength to the final article. The resulting casting is removed from the mold and presents the appearance, as in FIG. 22, of a series of pieces of stone 43 on a backing 44 with gaps 45 between the pieces 43 corresponding to the raised portions 41. Gaps 45 are then filled in with a different geometrically loaded mix, a grout, cement or other material poured or troweled in and allowed to set. In an alternative embodiment, the formal pattern may be a separately formed metal or wood lattice or the like which is placed on the base of the mold before pouring and which then becomes an integral part of the final casting.

The method of this invention may be used to produce any article which may be manufactured from castable materials, and particularly from cement and/or concrete materials. Thus, articles such as paving stones, tiles, counter tops, indoor or outdoor furniture items, structural building articles and decorative artistic and architectural elements are among the many items to which this method is applicable. In the area of architectural elements, the present method is applicable to the production of precast veneer panels for incorporation as integral portions of a precast or site-cast wall structure wherein the panels are provided on one side with means to engage and become incorporated in a poured concrete structure where the precast panel forms at least one portion of the form for the concrete.

The method of this invention is particularly adaptable to automated production environments wherein the mixing, measuring, loading and transferring of the mix is controlled according to a program entered into a computer or other machine controller which oversees the operations of mixers, dispensers, pouring chambers, extruders, passage of molds along an assembly line, and the like, in manners consistent with both the method of this invention and with automated assembly lines. In addition, apparatus described in this disclosure may be similarly adapted to automatic or manual adjustment within the scope of the present invention.

The above embodiments and drawings illustrate the preferred embodiments of the present invention and it is understood that many variations and modifications of those embodiments will be evident to those skilled in the art and may be carried out without departing from the spirit and scope of the present invention.

What is claimed is:

1. A method for producing reproducible colored and patterned castings which simulate natural stone having a pattern which continues from piece to piece, comprising the steps of;

a) preparing a plurality of molds to receive casting mixtures by designating a pour design to be followed;

b) preparing at least two different colored casting mixtures at a viscosity to facilitate even pouring;

c) loading the casting mixtures into a container in a horizontal and vertical geometric arrangement according to a predetermined formula for a particular pattern;

d) transferring the loaded mixtures to the molds in accordance with the pour design; and d) consolidating the mixture in the molds into a physically uniform mass and allowing the mass to set.

2. The method of claim 1 wherein preparing the molds comprises creating a diagram showing pieces to be cast in adjacent positions with a representation of the pattern thereon and transferring the representation to the molds to designate the pour design to be followed.

3. The method of claim 2 wherein the pattern is transferred as a series of lines across the molds.

4. The method of claim 2 wherein the pattern is transferred by marking entry and exit points for each part of the pattern on the edges of the molds.

5. The method of claim 2 wherein the pattern is transferred using a grid coordinate system applied to the molds.

6. The method of claim 2 comprising preparing a plurality of molds, wherein the molds are positioned adjacent to each other and the casting mixtures are transferred to the molds along a continuous path from one mold to the next following the pour design.

7. The method of claim 2 applied to an automated environment wherein the pour design is an element of a computer program and the steps of preparation, loading and transferring the casting mixtures are controlled by the computer program.

8. The method of claim 1 wherein the casting mixtures are transferred by pouring.

9. The method of claim 1 wherein the casting mixtures are transferred by spraying.

10. The method of claim 1 wherein the casting mixtures are transferred by extruding.

* * * * *